United States Patent
Sowerby et al.

(10) Patent No.: US 10,300,406 B1
(45) Date of Patent: *May 28, 2019

(54) VARIABLE FLOW IMMISCIBLE LIQUID SEPARATOR FOR IN-GROUND APPLICATIONS

(71) Applicant: Goslyn General, LLC, McKinney, TX (US)

(72) Inventors: John C. Sowerby, Pagosa Springs, CO (US); Giles S. Sowerby, Pagosa Springs, CO (US)

(73) Assignee: GOSYLN GENERAL, LLC, McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,519

(22) Filed: Sep. 20, 2017

Related U.S. Application Data

(60) Provisional application No. 62/496,149, filed on Oct. 6, 2016.

(51) Int. Cl.
| | | |
|---|---|---|
| *B01D 17/032* | (2006.01) | |
| *C02F 1/40* | (2006.01) | |
| *B01D 17/02* | (2006.01) | |
| *E03F 5/16* | (2006.01) | |
| *C02F 101/32* | (2006.01) | |
| *C02F 103/32* | (2006.01) | |

(52) U.S. Cl.
CPC ...... *B01D 17/0214* (2013.01); *B01D 17/0211* (2013.01); *C02F 1/40* (2013.01); *E03F 5/16* (2013.01); *C02F 2101/32* (2013.01); *C02F 2103/32* (2013.01)

(58) Field of Classification Search
CPC .......... E03F 5/16; C02F 1/40; B01D 17/0211; B01D 17/0214
USPC ......................................... 210/521, 538, 540
See application file for complete search history.

(56) References Cited

U.S. PATENT DOCUMENTS

| | | | | | |
|---|---|---|---|---|---|
| 1,164,527 | A | * | 12/1915 | Kelly ................. | B01D 17/0211 |
| | | | | | 210/540 |
| 1,200,951 | A | * | 10/1916 | Kelly ................. | B01D 17/0211 |
| | | | | | 210/540 |
| 1,902,171 | A | * | 3/1933 | Kopp ........................ | C02F 3/28 |
| | | | | | 210/538 |
| 3,465,889 | A | * | 9/1969 | Young, Jr. .......... | B01D 21/2444 |
| | | | | | 210/538 |
| 4,191,651 | A | | 3/1980 | Cheysson et al. | |
| 4,390,421 | A | * | 6/1983 | Hammerschmitt ....... | E03F 5/16 |
| | | | | | 210/522 |
| 5,993,646 | A | * | 11/1999 | Powers ..................... | E03F 5/16 |
| | | | | | 210/538 |
| 6,238,329 | B1 | | 5/2001 | Rogers | |
| 6,432,298 | B1 | | 8/2002 | Carvalko, Jr. | |

(Continued)

*Primary Examiner* — Christopher Upton
(74) *Attorney, Agent, or Firm* — Roger N. Chauza, PC

(57) ABSTRACT

A large capacity immiscible liquid separator adapted for placement in the ground, rather than under the sinks of food processing facilities. The liquid separator has a large oil compartment that can be vacuum suctioned to empty the contents thereof. Large volumes of the immiscible liquid influent can be processed without the use of a ball-type valve. A large circumference weir allows a large volume of separated waste water to overflow to the sewer system. The weir can be H-shaped to provide a large circumference and thus accommodate large separated waste water flows thereover.

11 Claims, 2 Drawing Sheets

(56) References Cited

U.S. PATENT DOCUMENTS

| | | | |
|---|---|---|---|
| 6,517,715 B1* | 2/2003 | Batten | B01D 17/0214 210/540 |
| 7,297,284 B2* | 11/2007 | Owen | B01D 17/0214 210/540 |
| 7,481,321 B2* | 1/2009 | Ismert | B01D 21/2444 210/538 |
| 8,153,004 B2* | 4/2012 | Rodriguez-Jovet | B01D 17/0214 210/521 |
| 8,470,080 B1 | 6/2013 | Ball, IV et al. | |
| 8,480,908 B2 | 7/2013 | Hann | |
| 8,691,089 B2 | 4/2014 | Bias et al. | |
| 8,900,463 B2 | 12/2014 | Sowerby et al. | |
| 8,915,380 B2* | 12/2014 | Sowerby | B01D 17/0211 210/521 |
| 8,968,579 B2 | 3/2015 | Bjornson et al. | |
| 9,314,715 B2 | 4/2016 | Grave et al. | |
| 2003/0127376 A1 | 7/2003 | Maddock et al. | |
| 2006/0219629 A1* | 10/2006 | Noestheden | B01D 17/0214 210/540 |

* cited by examiner

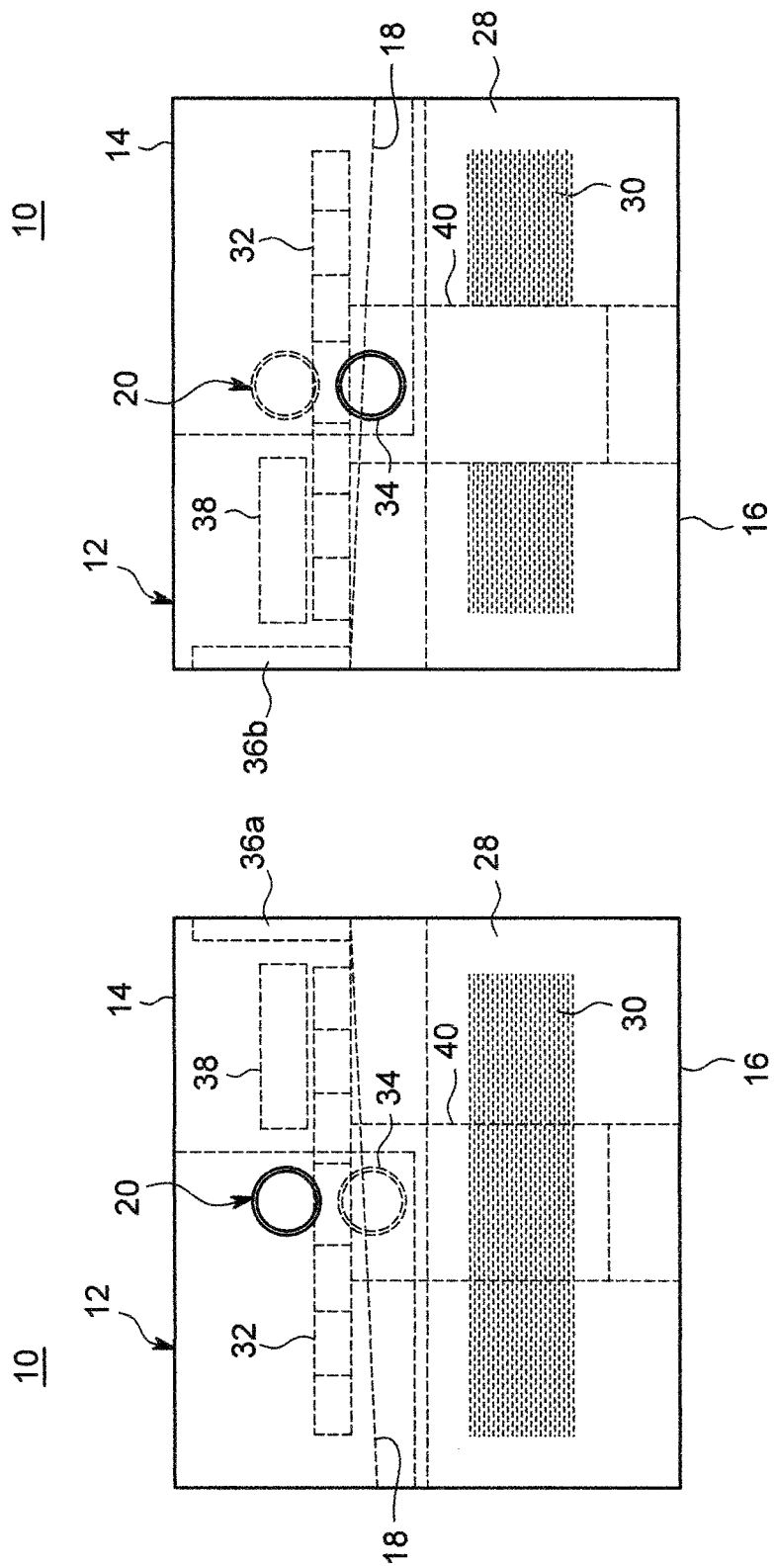

US 10,300,406 B1

VARIABLE FLOW IMMISCIBLE LIQUID SEPARATOR FOR IN-GROUND APPLICATIONS

RELATED APPLICATION

This non-provisional patent application claims the benefit of U.S. provisional application filed Oct. 6, 2016, Ser. No. 62/496,149.

TECHNICAL FIELD OF THE INVENTION

The present invention relates in general to liquid separators, and more particularly to water/oil separation apparatus that can accommodate a wide range of effluent flows and be buried in the ground to also separate the effluent from floor drains and floor mounted mop sinks.

BACKGROUND OF THE INVENTION

In several industries, and in particular the food industry, there is a need to separate liquid greases, fats and oils from waste water prior to passing the waste water to the sewage system. The waste water could be, for example, discharged from a washing device for cleaning dinnerware and cooking utensils, from floor drains and mop sinks. If the greases and fats solidify in the sewage system, a blockage can occur which is expensive to remediate.

It has been found that the liquid wastes from kitchens are often immiscible mixtures of water and oils. As is well known, a first immiscible liquid of one specific gravity will float on a second immiscible liquid having a greater specific gravity. It has also been experimentally determined that the general kitchen waste oils have a specific gravity of about 0.92-0.93, whereas the specific gravity of water is about 1.0. As such, the kitchen oils float on top of the waste water.

Some municipalities require that separators be able to treat effluent mixtures of immiscible liquids from floor drains, floor mounted mop sinks, and the like. Some floor-mounted immiscible liquid separators are not adapted for treating effluent liquids from such equipment. These liquid separators are often equipped with ball-type float valves that require daily cleaning, and thus such type of separators cannot be used as in-ground separators, as it would be very troublesome to gain daily access to the ball-type float valves and clean them. Also, this type of immiscible liquid separator requires frequent internal access to remove the particulate matter that has settled to the bottom of the separators, thus requiring easy access to the internal areas of the separators.

U.S. Pat. No. 7,297,284 by Owen et al., discloses various embodiments of immiscible liquid separators. Described therein are parameters that are important when considering the construction of a separator to separate the oil content from the water content of a waste liquid. Two immiscible liquids of different specific gravities will separate under the force of gravity into two separate layers in a calculable or measurable time period, according to Stokes Law. Typical immiscible liquid separators are constructed with a separation chamber of sufficient size to allow the waste liquid to separate therein, with the oil floating on top of the water. As more waste liquid is added to the separator, the floating oil rises and overflows via an oil outlet into an oil reservoir. The previously separated water flows from the separation chamber under a separator plate into a water chamber where, when the level is sufficiently high, the separated water overflows over a fixed height linear weir and out of the separator. The linear weir spans the distance between the opposite sides of the separator enclosure. If the mixture of two immiscible liquids is introduced into the separation chamber at a known flow rate, then the chamber can be sized to ensure that separation is completed before the heavier liquid (water) flows under the separation plate to the separated water chamber. A ball-type float valve is employed to prevent surges of separated water from flowing upwardly into the oil reservoir. The disadvantage of using a ball-type float valve is that it often requires daily maintenance to clean it and prevent floating deposits from allowing water to pass with the oil through the valve.

In the prior art immiscible liquid separators, the weir is often a planar plate that extends laterally between sidewalls of the separator. Thus, when waste liquid influents enter the separator and are separated, the separated water flows over the weir and exits the separator and is drained away via the water drainage system. The separated water flows over the linear weir much like excess flood water flows over a spillway, dam or levy.

Immiscible liquid separators can be employed in restaurants, and the like, and are often mounted on the floor under the sink or wash basin drains. The separated oil must be watched carefully so that the reservoir does not become full or overflow. In the event that the facility produces a substantial amount of immiscible waste liquids, then either the oil reservoir of the separator must be drained more often, or a larger oil reservoir must be provided.

From the foregoing, it can be seen that a need exists for an immiscible liquid disposal system which handles a variable quantity of immiscible liquid mixtures, and does not require a ball-type float valve. This can be accomplished by having a long-length weir that handles a wide range in volumes of separated water, without requiring a large foot print for the separator.

SUMMARY OF THE INVENTION

According to an embodiment of the invention, disclosed is a separator for separating immiscible liquids, where the separator includes an enclosure having an inlet for coupling an immiscible influent mixture into the enclosure. The immiscible influent mixture includes a first immiscible liquid having a given density, and a second immiscible liquid having a density greater than the density of the first immiscible liquid. The enclosure holds the immiscible influent mixture for a sufficient time so that the first immiscible liquid rises and floats on top of the second immiscible liquid. A liquid discharge outlet of the enclosure couples the second immiscible liquid out of the enclosure. Further included is an upper long H-shaped or otherwise irregular shaped, continuous open top weir connected to a lower smaller, vertical, rectangular discharge stack with an open bottom that is immersed in the second immiscible liquid. The second immiscible liquid flows over the H-shaped open top of the weir and to the second liquid discharge outlet. The discharge stack has an open top. The first immiscible liquid flows over another much shorter weir that is set at a calculated distance above the long-length weir over which the second liquid flows. It flows directly to a storage enclosure incorporated into the vessel.

According to a second embodiment, disclosed is a separator for separating immiscible liquids comprising water and oil. The separator includes an enclosure having a waste liquid inlet, an oil discharge outlet and a water discharge outlet. The enclosure holds the waste liquid input thereto via the waste liquid inlet until the waste liquid separates into an oil content and a water content, with the water content settling to a bottom of the enclosure and the oil content floating on the water content. The enclosure has a top that slants upwardly from one side of the separating enclosure to the other so the separated oil is directed to the rectangular oil discharge weir.

A further embodiment of the invention includes locating two rectangular open top vents along the top of the slanted top of the separating enclosure so that any entrained air can escape and not cause burping at the oil overflow weir.

Another embodiment disclosed is a separator for separating immiscible liquids, which includes an enclosure having an influent inlet located at a frontal side thereof for coupling an immiscible mixture into the enclosure, where the immiscible mixture includes a first immiscible liquid having a given density and a second immiscible liquid having a density greater than the density of the first immiscible liquid. The enclosure has a frontal compartment for receiving the immiscible mixture and a separation compartment for holding the immiscible mixture for a sufficient time that the first immiscible liquid floats on top of the second immiscible liquid. A discharge outlet is located at an outlet side of the enclosure for coupling the second immiscible liquid out of the enclosure. The outlet side is located on a side of the enclosure opposite the frontal side, whereby the second immiscible liquid flows through the enclosure from the frontal side to the outlet side. The enclosure does not have an outlet for discharging the first immiscible liquid out of the enclosure in response to the influent being coupled into the enclosure. A storage tank is located in the enclosure for storing the first immiscible liquid until removed by external means. A weir has a long open top that has a circumferential rim, and the vertical discharge stack has an open bottom immersed in the second immiscible liquid of the separation compartment. The second immiscible liquid flows over the circumferential open top rim of the weir and to the discharge outlet.

BRIEF DESCRIPTION OF THE DRAWINGS

Further features and advantages will become apparent from the following and more particular description of the preferred and other embodiments of the invention, as illustrated in the accompanying drawings, in which like reference characters generally refer to the same parts, functions or elements throughout the views, and in which:

FIG. 3 is a left inlet side view of the immiscible liquid separator system of FIG. 1; and FIG. 4 is right outlet side view of the immiscible liquid separator system of FIG. 1.

DETAILED DESCRIPTION OF THE INVENTION

Figure 1:
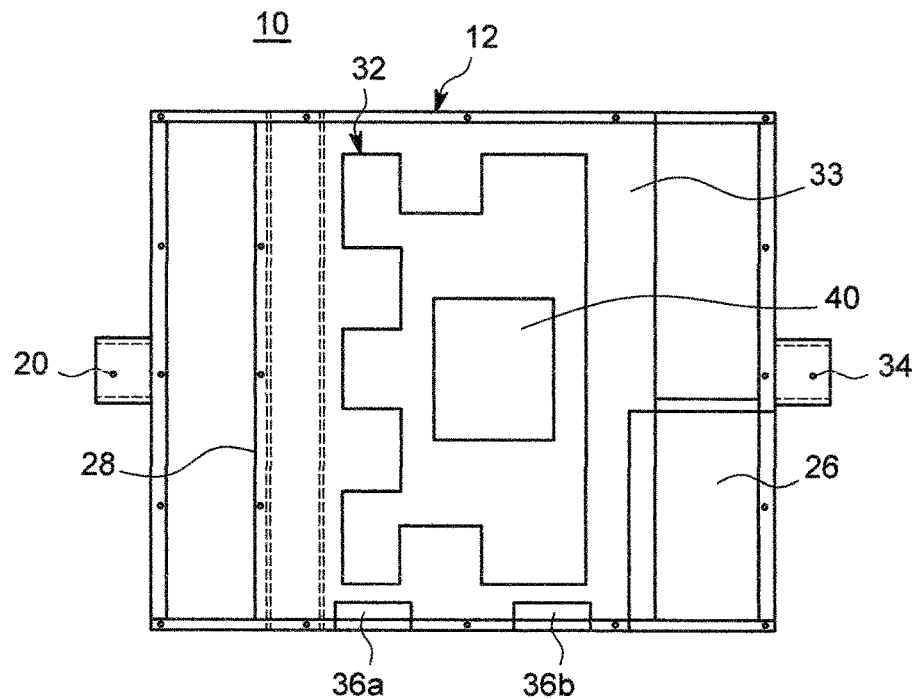
FIG. 1 is a top view of an immiscible liquid separator system constructed according to an embodiment of the invention.

With reference to FIGS. 1-4 of the drawings, there is illustrated an immiscible liquid separator 10 adapted for accommodating a wide range of liquid flows. The illustrated immiscible liquid separator unit 10, constructed according to one embodiment of the invention, is adapted for separating immiscible liquids, such as oils and water commonly produced in food processing facilities. The immiscible liquid separator 10 comprises an enclosure 12 having a generally rectangular top 14 covered by a lid (not shown). The lid is a shoe-box type lid sealed to the rim of the open top by a neoprene seal. The lid can be fastened to the enclosure 12 by clips or other quick release fasteners. The lid can be periodically removed to gain access to an oil reservoir to remove the oil by suctioning it out of the oil reservoir. The top is constructed with a flange (not shown) therearound to provide an interface with the lid. The lid is constructed with peripheral down-turned flange. The immiscible liquid separator 10 also includes a planar bottom 16. The various side, bottom and lids can be constructed of stainless steel, synthetic or other suitable materials. The immiscible liquid separator 10 is generally a rectangular box type of enclosure that is adapted for being installed in the ground.

It is contemplated that the immiscible liquid separator 10 will be constructed to process a large flow of a mixture of waste water and waste oils and grease, and thus the separator will be capable of storing up to about 50 gallons of oil. As such, the immiscible liquid separator 10 can be buried in the ground so that it does not require any working space on the floor of a restaurant facility, or the like. It is further contemplated that the oil will be removed from an oil reservoir of the separator 10 by pumping the same out of the unit 10 by a pumper truck, or the like.

The immiscible liquid separator 10 is constructed with a slanted floor 18 that slants upwardly from the left side (viewer facing the front of the unit 10 from the waste liquid inlet 20, as in FIG. 3) to the right side of the unit 10.

The enclosure 12 includes a frontal inlet compartment 22, a middle separation compartment 24, and an oil reservoir 26. The frontal compartment 22 is constructed with an influent inlet pipe 20 for allowing kitchen sink wastes to be drained into the frontal compartment 22. The frontal compartment 22 is separated from the middle separation compartment 24 by a vertical wall 28 that is constructed with a section having perforations 30. According to a feature of the invention, the perforations 30 are of a desired size and density, and are formed in only a portion of the vertical wall 28 to provide a controlled flow of the influent from the frontal compartment 22 to the intermediate separation compartment 24. As such, if a surge of the influent mixture is coupled into the frontal compartment via the inlet 20, only a maximum volume of the influent mixture will be transferred to the intermediate separation compartment 24, and the remaining influent will continue to fill up the frontal compartment 22. When the surge of the influent subsides, the level of liquid in the frontal compartment 22 will lower and drain into the intermediate compartment 24.

To be described below in detail, the separated water overflows from an H-shaped weir 32 onto an elevated floor 33 and out of a water discharge outlet pipe 34. The separated water discharged from the immiscible liquid separator 10 can be coupled via drainage pipes to the waste water drainage system, such as a municipal sewer pipe.

The frontal compartment 22 serves to separate the particulate matter from the liquid content of the influent. The particulate matter thus settles to the bottom of the inlet frontal compartment 22 and can be removed periodically by vacuum techniques.

Once the influent waste liquid is drained into the frontal compartment 22 of the enclosure 12, and passes through the perforated wall 28, the mixture of waste oil and water remains in the intermediate separation compartment 24 for a time sufficient to allow the immiscible liquids to separate in a natural manner. The waste oils of the influent mixture have a general specific gravity that is less than that of the waste water. Accordingly, the immiscible liquid with a lower specific gravity (oil) will float on top of the immiscible liquid having a higher specific gravity (water). In other words, the separated oils will gravitate upwardly and eventually float on top of the separated water in the intermediate separation compartment 24. This action continues to occur whenever new waste liquid mixtures are drained into the immiscible liquid separator 10 via the inlet 20. The volume of the enclosure 12 is related to the rate at which waste liquids can be separated into the oil content and the water content. While not shown, a heater can be optionally located in the immiscible liquid separator 10 in contact with the oil layer to heat such liquid layer and assure that any fat or grease is maintained in a liquefied state.

The intermediate separation compartment 24 thus contains the lower layer of separated water and an upper layer of separated oil. Any initial air that is in the enclosure is pushed out (by the incoming waste liquid) through one or both breather tubes 36a and 36b. Air bubbles entrained in the influent can thus escape from the immiscible liquid separator 10 via the breather tubes 36a and 36b. When additional influent is drained into the frontal compartment 22, and thereafter flows into the separation compartment 24 via the wall perforations 30, the separated water in separation compartment 24 rises. The rising water in the separation compartment 24 causes the overlying oil layer to be pushed upwardly along the slanted floor 18 toward the oil overflow 38. The temporary upward pressure on the oil layer in the separation compartment 24 forces it upwardly and over the oil overflow 38 and into the large oil reservoir 26. As the oil continues to be separated from the waste water, the oil continues to flow into the reservoir 26. As noted above, the oil reservoir 26 can hold upwardly of 50 gallons and thus need not be pumped down weekly. Because the separated oil is contained in the enclosure 12 of the immiscible liquid separator 10, there is no oil outlet to allow excess oil to be discharged from the separator enclosure 12 each time an additional amount of the immiscible liquid mixture is drained into the frontal compartment 22.

It can be appreciated that the immiscible liquid separator 10 does not require an oil valve, whereas many other immiscible liquid separators do require an oil valve, such as a ball-type valve. The ball-type oil valves required in many prior art separators prevent separated water from entering the separated oil section of the separator 10. When an oil valve is not required, the cost of the unit and the maintenance thereon are both reduced.

Figure 2:
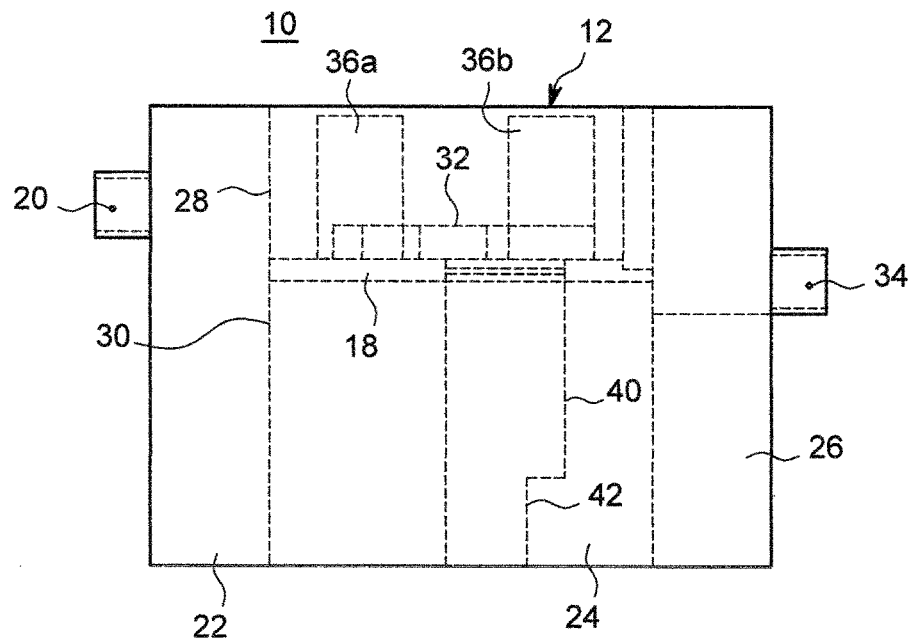
FIG. 2 is a side view of the immiscible liquid separator system of FIG. 1.

It is noted in FIG. 2 that the influent inlet 20 is located on the frontal side of the separator unit 10 at an elevation higher than the separated water outlet 34. Thus, when kitchen wastes are drained into the immiscible liquid separator 10, there is a temporary internal pressure on the separated water in the separation compartment 24 which causes it to rise upwardly in a square water baffle tube 40. The bottom opening 42 of the water baffle tube 40 is located low in the separation compartment 24, well in the bottom portion of the separated water. This assures that no overlying separated oil will enter into the bottom opening 42 of the water baffle tube 40.

In accordance with an important feature of the invention, the separated water escapes from the separation chamber 24 up the water baffle tube 40 and over the irregular-shaped weir 32. The water baffle tube 40 and the weir 32 are constructed to accommodate a wide range of water flow rates, e.g., about 10 to 50 gallons per minute. The top opening in the weir 32 is elongated due to its irregular shape to accommodate a large volume of separated water. The shape of the weir 32 is H-shaped so that the circumference thereof is greater than either a square, round or oval shaped weir. While the H-shaped weir 32 has a substantial circumferential length, it can still fit within the housing 12 of the immiscible liquid separator 10 due to its small footprint, and thus does not require a lot of area. The H-shaped weir 32 is somewhat serpentine in shape, in that it has portions that traverse opposite directions to thereby lengthen the overall length of the rim of the weir 32.

As noted above, when additional waste liquid is drained into the enclosure 12 via the inlet 20, the separated water flows over the irregular-shaped rim of the weir 32. The separated waste water then pours down onto the elevated floor 33 and then out of the water discharge outlet 34.

As can be seen from the foregoing, the immiscible liquid separator 10 is constructed so that the liquid processed proceeds from the frontal part of the separator 10, via the liquid inlet 20, through the length of the separator 10 to the separated water outlet 34 which is located on the opposite end of the separator 10. While most separators of such type include a linear weir that is located cross-wise in the separator, the present immiscible liquid separator 10 includes an irregular-shaped weir outlet having a rim with a circumference. The circumferential weir 32 allows a higher volume of separated water to be processed and expelled from the separator 10. The separated water can flow over any portion of the circumferential weir 32 and thus accommodate a higher volume than a linear weir. The conventional linear weir is limited to the width of the separator, and allows the separated water to flow generally only in one direction over the top rim of the linear weir.

While the preferred and other embodiments of the invention have been disclosed with reference to a specific immiscible liquid separator, and associated methods thereof, it is to be understood that many changes in detail may be made as a matter of engineering choices without departing from the spirit and scope of the invention, as defined by the appended claims.

What is claimed is:

1. A separator for separating immiscible liquids, comprising:
    an enclosure having an influent inlet located at a frontal side thereof for coupling an immiscible mixture into the enclosure, the immiscible mixture including a first immiscible liquid having a given density, and including a second immiscible liquid having a density greater than the density of the first immiscible liquid;
    said enclosure having a frontal compartment for receiving the immiscible mixture from said influent inlet;
    said enclosure having a separation compartment for receiving the immiscible mixture from said frontal compartment and for holding the immiscible mixture for a sufficient time that the first immiscible liquid rises and floats on top of the second immiscible liquid;
    a discharge outlet located at an outlet side of said enclosure for coupling the second immiscible liquid out of said enclosure, said outlet side located on a side of said enclosure opposite said frontal side, whereby the second immiscible liquid flows through said enclosure from the frontal side to said outlet side;
    said enclosure not having an outlet for discharging the first immiscible liquid out of said enclosure in response to the immiscible mixture being coupled into said enclosure;
    a storage tank located in said enclosure for storing the first immiscible liquid until removed by external means, the first immiscible liquid rises on the second immiscible liquid in said separation compartment until the first immiscible liquid overflows into said storage tank; and a weir having an open top that has a circumferential rim, and said weir located atop a vertical chute with an open bottom that is immersed in the second immiscible liquid of said separation compartment, the second immiscible liquid flowing up said vertical chute and over the circumferential open top rim of said weir and to said discharge outlet, and said chute extending upwardly through the first immiscible liquid and preventing the first immiscible liquid from entering said chute.

2. The separator of claim 1, further including a perforated baffle separating said frontal compartment from said separation compartment, and perforations in said perforated baffle functioning to control the rate of flow of the immiscible mixture from said frontal compartment to said separation compartment, said frontal compartment storing solids that enter the separator in the influent until removed.

3. The separator of claim 1, wherein said weir has an open top that is H shaped that maximizes the length of the weir within a small footprint.

4. The separator of claim 1, wherein said enclosure does not require an oil valve to prevent water from being discharged into the storage tank.

5. The separator of claim 1, wherein said separator is located underground.

6. The separator of claim 5, wherein the first immiscible liquid comprises oil, and further including a pumper truck for suctioning the oil from the storage tank in said separator.

7. The separator of claim 1, wherein said storage tank has a capacity to store up to about fifty gallons of the first immiscible liquid.

8. The separator of claim 1, wherein said influent inlet is located at an elevation higher than said discharge outlet.

9. The separator of claim 1, wherein said weir is serpentine in shape.

10. The separator of claim 1, wherein the second immiscible liquid comprises waste water that rises inside said weir and overflows over the circumferential rim of said weir in all directions including towards opposite sides of said separator and towards the frontal side and towards the outlet side of said separator.

11. A separator for separating immiscible liquids, comprising:

an enclosure having an influent inlet located at a frontal side thereof for coupling an immiscible mixture into the enclosure, the immiscible mixture including oil and waste water;

said enclosure located underground;

said enclosure having a frontal compartment for receiving the immiscible mixture from said influent inlet;

said enclosure having a separation compartment for receiving the immiscible mixture from said frontal compartment and for holding the immiscible mixture for a sufficient time that the oil separates and rises and floats on top of the separated waste water;

a discharge outlet located at an outlet side of said enclosure for coupling the separated waste water out of said enclosure, said outlet side located on a side of said enclosure opposite said frontal side, whereby the waste water flows through said enclosure from the frontal side to said outlet side;

said enclosure not having an outlet for discharging the separated oil out of said enclosure in response to the immiscible mixture being coupled into said enclosure;

a storage tank having a storage capacity of up to about fifty gallons, said storage tank located in said enclosure for storing the separated oil until removed by evacuating the separated oil with suction means, the separated oil rises on the separated waste water in said separation compartment until the separated oil overflows into said storage tank;

a weir having an open top that has a circumferential rim, and said weir located atop a vertical chute with an open bottom that is immersed in the separated waste water of said separation compartment, the separated waste water flowing up said vertical chute and over the circumferential open top rim of said weir and to said discharge outlet, and said chute extending upwardly through the separated waste water and preventing the separated oil from entering said chute.

* * * * *